US012674961B2

(12) United States Patent
Ode et al.

(10) Patent No.: US 12,674,961 B2
(45) Date of Patent: Jul. 7, 2026

(54) OPTICAL SYSTEM AND IMAGE PICKUP APPARATUS HAVING THE SAME

(71) Applicant: CANON KABUSHIKI KAISHA, Tokyo (JP)

(72) Inventors: Takashi Ode, Tochigi (JP); Takahiro Hatada, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 18/596,299

(22) Filed: Mar. 5, 2024

(65) Prior Publication Data

US 2024/0302626 A1 Sep. 12, 2024

(30) Foreign Application Priority Data

Mar. 8, 2023 (JP) ................................. 2023-035919

(51) Int. Cl.
G02B 9/60 (2006.01)

(52) U.S. Cl.
CPC ...................................... G02B 9/60 (2013.01)

(58) Field of Classification Search
CPC ....................................................... G02B 9/60

USPC .......................................................... 359/767
See application file for complete search history.

(56) References Cited

U.S. PATENT DOCUMENTS

2007/0126911 A1* 6/2007 Nanjo ............ G02B 15/145115
348/335

FOREIGN PATENT DOCUMENTS

JP 2015200845 A 11/2015

* cited by examiner

*Primary Examiner* — Bumsuk Won
*Assistant Examiner* — Mitchell T Oestreich
(74) *Attorney, Agent, or Firm* — Canon U.S.A., Inc. IP Division

(57) ABSTRACT

An optical system includes, in order from an object side to an image side, a first lens unit having positive refractive power, a second lens unit having positive refractive power, a third lens unit, a fourth lens unit having positive refractive power, and a fifth lens unit having negative refractive power. During focusing from infinity to a close distance, a distance between adjacent lens units changes and the second lens unit and the fourth lens unit move toward the object side. At least one of the second lens unit and the fourth lens unit includes two or more lenses. The first lens unit includes two or more negative lenses. A predetermined inequality is satisfied.

20 Claims, 9 Drawing Sheets

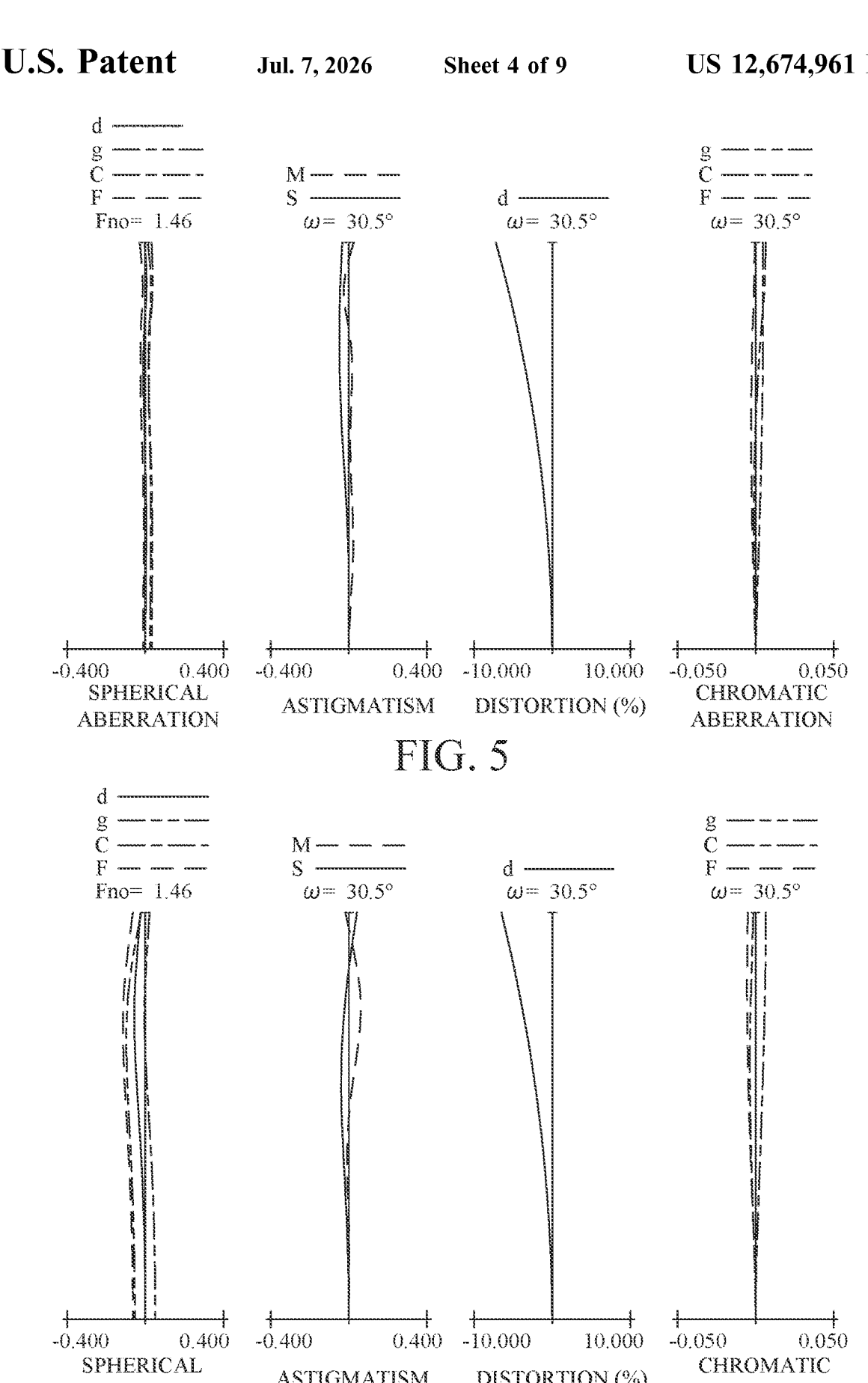

d ————
g ————
C ————
F ————
Fno= 1.46

M — — —
S ————
ω= 38.4° d ————
ω= 38.4° g ————
C ————
F ————
ω= 38.4°

-0.400    0.400
SPHERICAL
ABERRATION

-0.400    0.400
ASTIGMATISM

-10.000    10.000
DISTORTION (%)

-0.050    0.050
CHROMATIC
ABERRATION d ————
g ————
C ————
F ————
Fno= 1.46

M — — —
S ————
ω= 38.4° d ————
ω= 38.4° g ————
C ————
F ————
ω= 38.4°

-0.400    0.400
SPHERICAL
ABERRATION

-0.400    0.400
ASTIGMATISM

-10.000    10.000
DISTORTION (%)

-0.050    0.050
CHROMATIC
ABERRATION

OPTICAL SYSTEM AND IMAGE PICKUP APPARATUS HAVING THE SAME

BACKGROUND

Technical Field

One of the aspects of the embodiments relates generally to an optical system, and more particularly to an optical system suitable as an imaging optical system for an image pickup apparatus such as a digital still camera, a digital video camera, a broadcasting camera, a film-based camera, or a surveillance camera.

Description of Related Art

Recent image pickup apparatuses using solid-state image sensors such as a CCD and a CMOS sensor have been demanded to reduce the size of a wide-angle lens having a large diameter and to improve performance.

Japanese Patent Laid-Open No. 2015-200845 discloses a wide-angle lens that has a large diameter, can perform focusing, and can maintain good optical performance.

The wide-angle lens disclosed in Japanese Patent Laid-Open No. 2015-200845 includes many lenses in the focusing lens unit. Therefore, this wide-angle lens can satisfactorily suppress aberration fluctuations during focusing, but the focus lens unit is heavy and unsuitable for high-speed and quiet driving.

SUMMARY

An optical system according to one aspect of the embodiments includes, in order from an object side to an image side, a first lens unit having positive refractive power, a second lens unit having positive refractive power, a third lens unit, a fourth lens unit having positive refractive power, and a fifth lens unit having negative refractive power. During focusing from infinity to a close distance, a distance between adjacent lens units changes and the second lens unit and the fourth lens unit move toward the object side. At least one of the second lens unit and the fourth lens unit includes two or more lenses. The first lens unit includes two or more negative lenses. The following inequality is satisfied:

$$0.040 < T4/TTL < 0.590$$

where TTL is an overall optical length that is a distance on an optical axis from a lens surface closest to the object to an image plane of the optical system in an in-focus state at infinity, and T4 is a thickness on an optical axis of the fourth lens unit. An image pickup apparatus having the above optical system also constitutes another aspect of the disclosure.

Further features of various embodiments of the disclosure will become apparent from the following description of embodiments with reference to the attached drawings.

BRIEF DESCRIPTION OF THE DRAWINGS

FIG. 5 is a longitudinal aberration diagram of the optical system according to Example 2 in the in-focus state at infinity.

FIG. 6 is a longitudinal aberration diagram of the optical system according to Example 2 in an in-focus state at a close distance.

DESCRIPTION OF THE EMBODIMENTS

Figure 1:
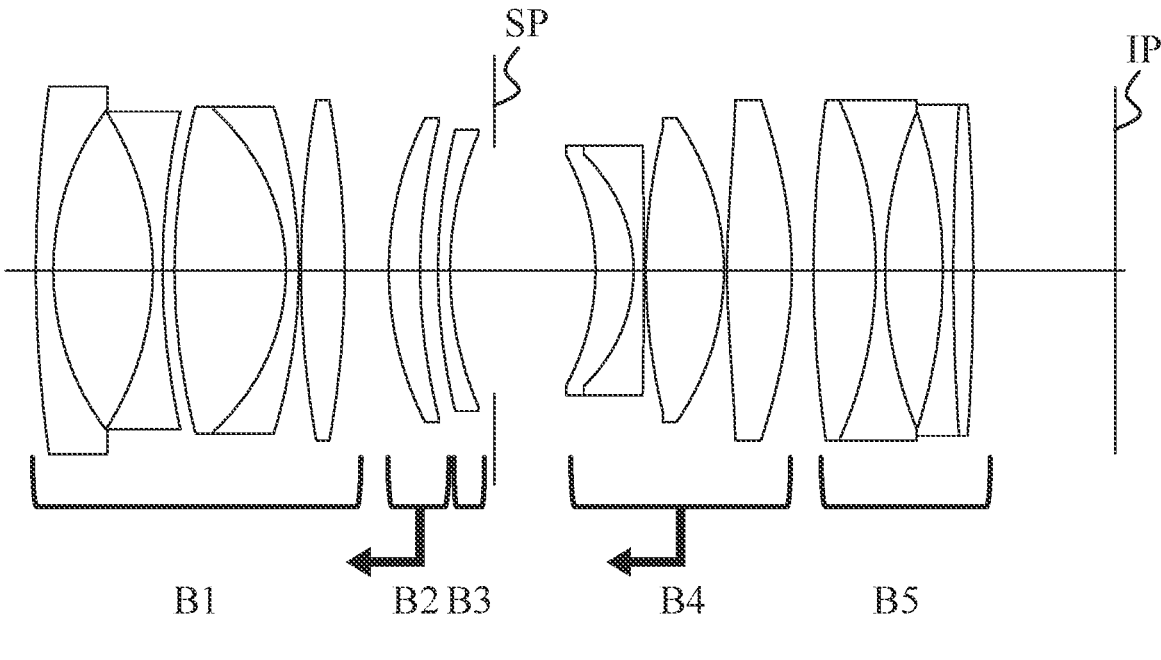
FIG. 1 is a lens sectional view of an optical system according to Example 1 in an in-focus state at infinity.
Figures 2, 3:
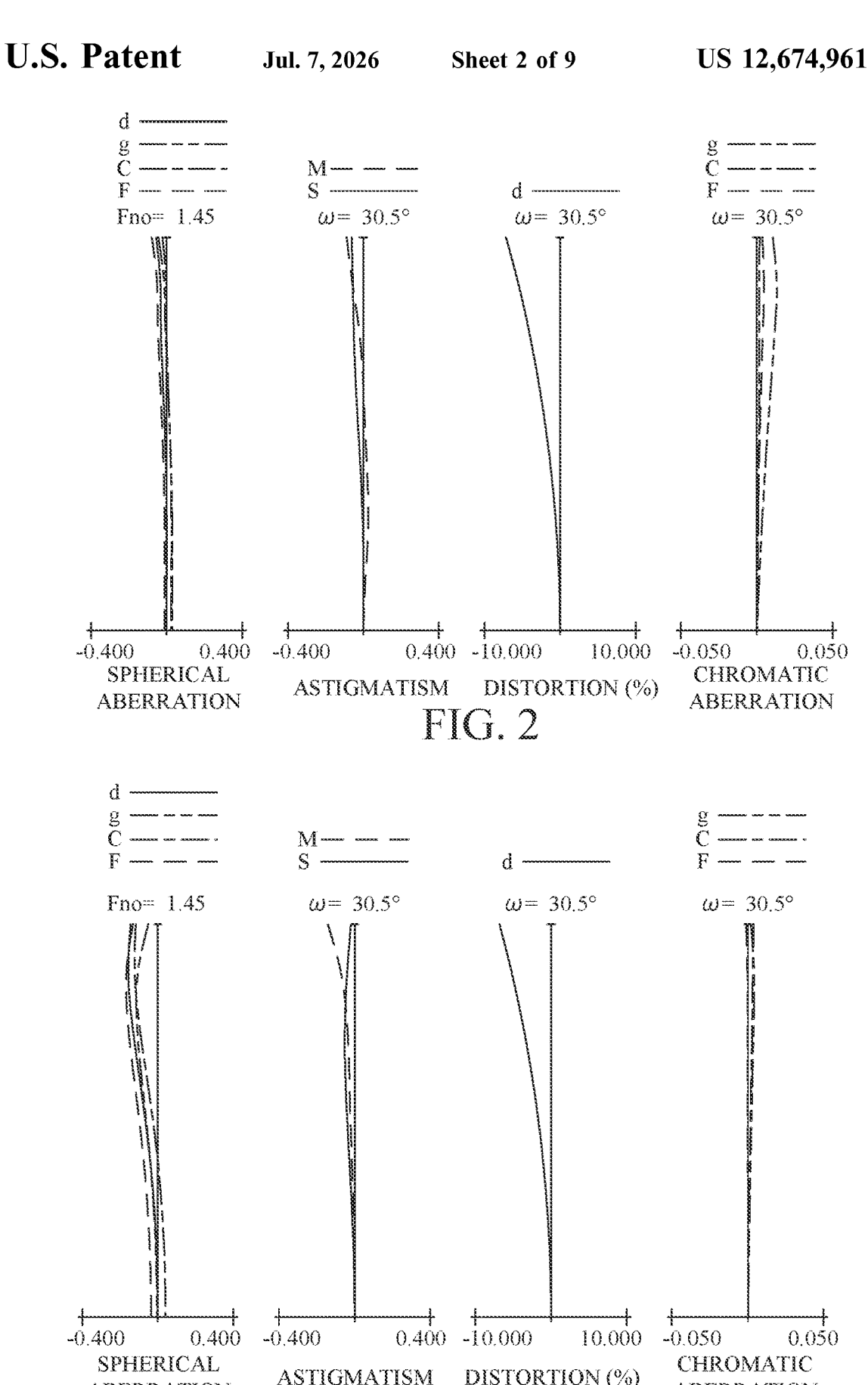
FIG. 2 is a longitudinal aberration diagram of the optical system according to Example 1 in the in-focus state at infinity.
FIG. 3 is a longitudinal aberration diagram of the optical system according to Example 1 in an in-focus state at a close distance (short distance).
Figure 4:
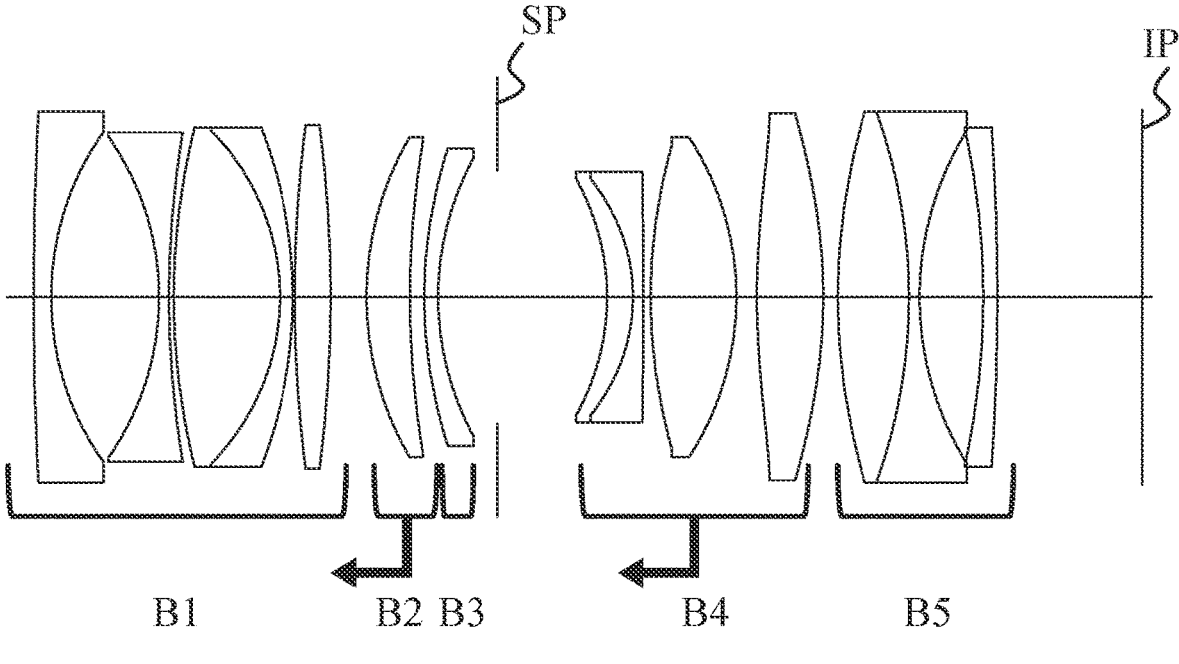
FIG. 4 is a lens sectional view of an optical system according to Example 2 in an in-focus state at infinity.
Figure 7:
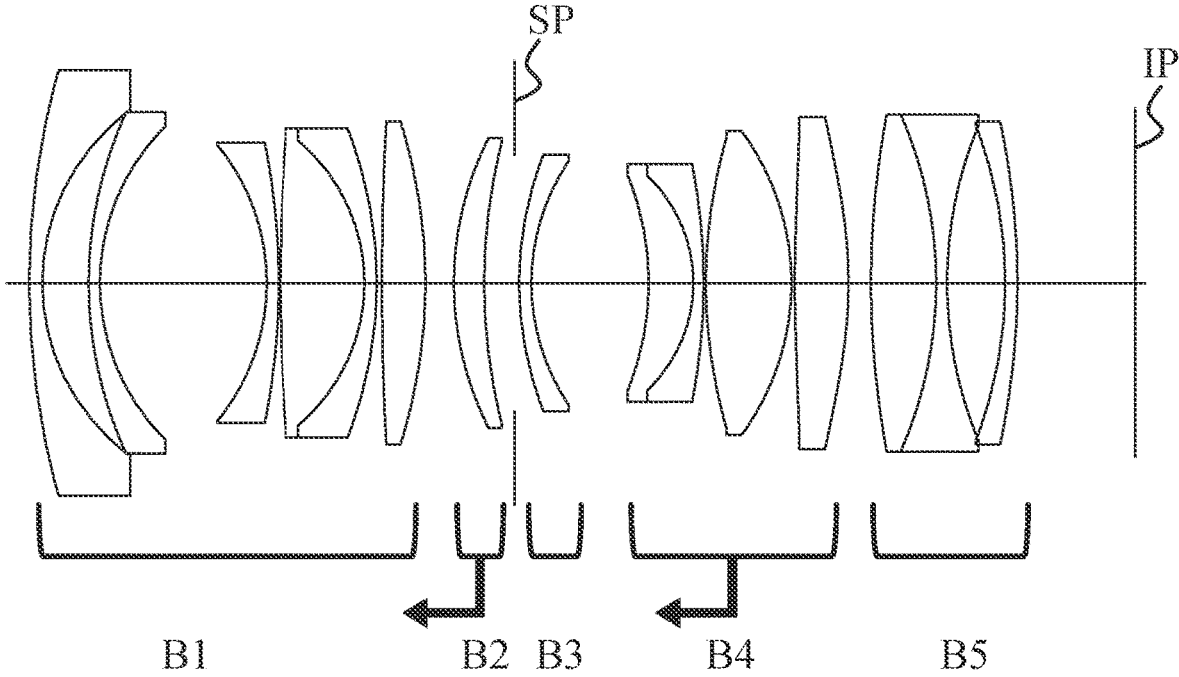
FIG. 7 is a lens sectional view of an optical system according to Example 3 in an in-focus state at infinity.
Figures 8, 9:
FIG. 8 is a longitudinal aberration diagram of the optical system according to Example 3 in the in-focus state at infinity.
FIG. 9 is a longitudinal aberration diagram of the optical system according to Example 3 in an in-focus state at a close distance.
Figure 10:
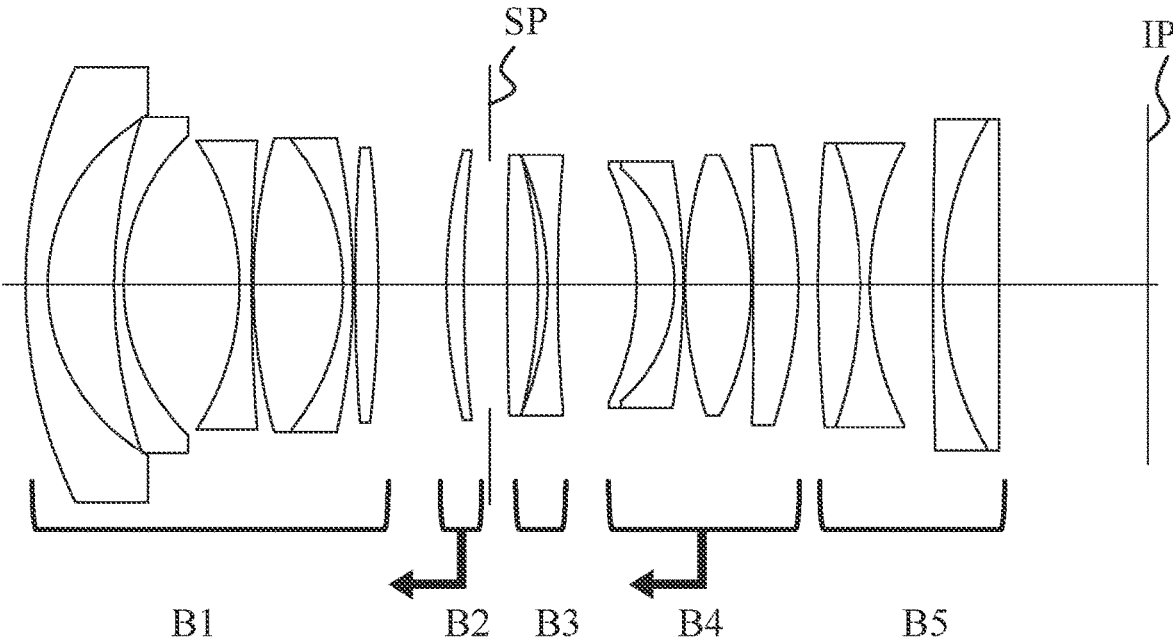
FIG. 10 is a lens sectional view of an optical system according to Example 4 in an in-focus state at infinity.
Figure 11:
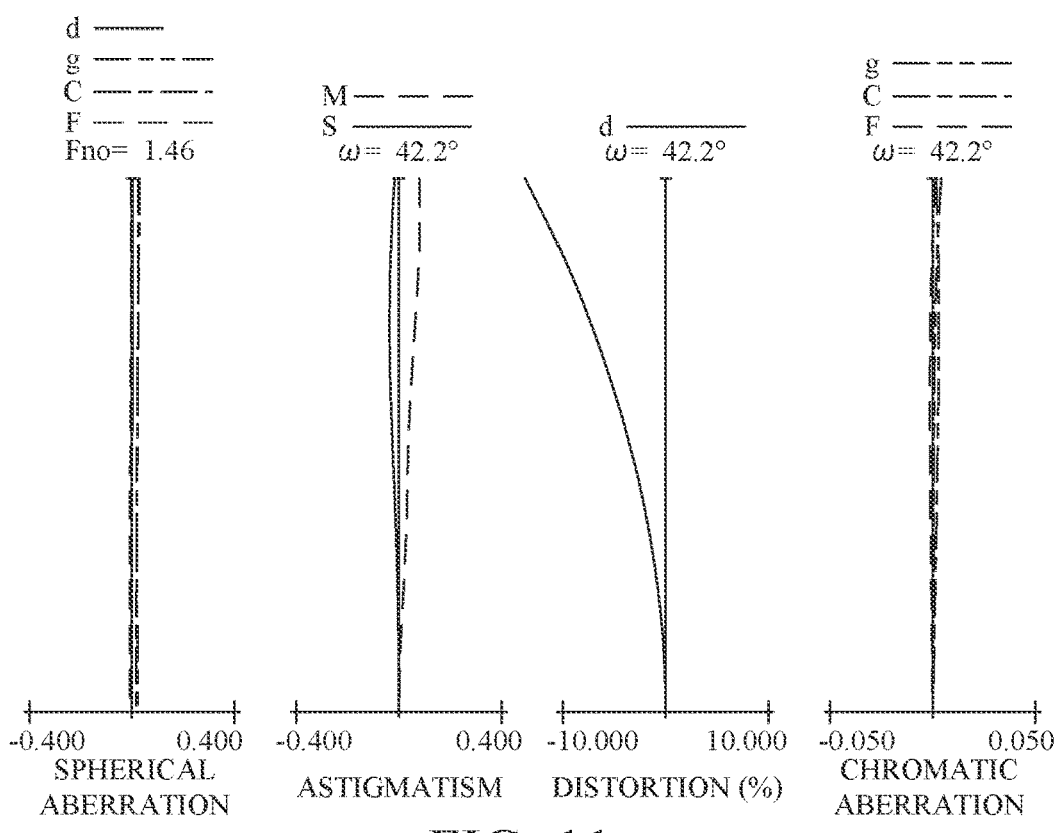
FIG. 11 is a longitudinal aberration diagram of the optical system according to Example 4 in the in-focus state at infinity.
Figure 12:
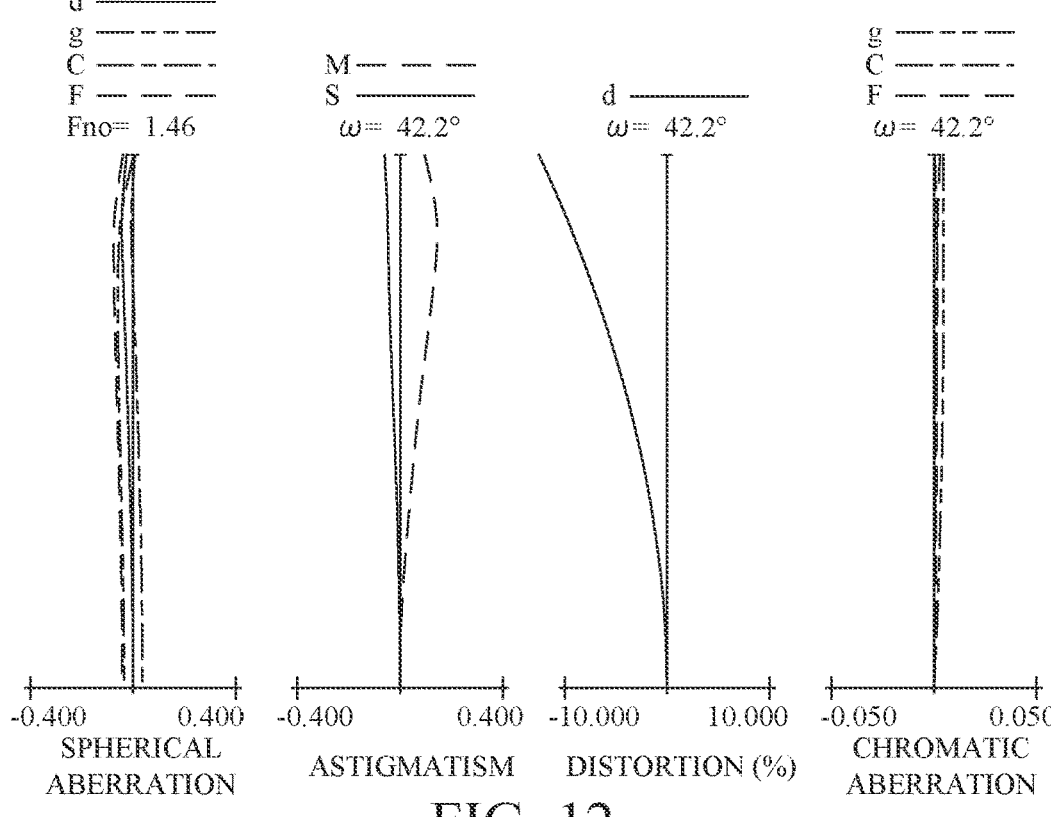
FIG. 12 is a longitudinal aberration diagram of the optical system according to Example 4 in an in-focus state at a close distance.

Referring now to the accompanying drawings, a description will be given of optical systems and an image pickup apparatus having each optical system according to embodiments according to the disclosure.

FIGS. 1, 4, 7, and 10 are lens sectional views of optical systems according to Examples 1 to 4 in in-focus states at infinity (when focused on an infinity object), respectively. The optical system according to each example is an imaging optical system for an image pickup apparatus such as a digital still camera, a film-based camera, a digital video camera, a surveillance camera, a broadcasting camera, and an on-board (in-vehicle) camera.

In each lens sectional view, a left side is an object side (enlargement conjugate surface side), and a right side is an image side (reduction conjugate surface side). The optical system according to each example includes a plurality of lens units. In this specification, a lens unit is a group of lenses that move or stand still during focusing. That is, in the optical system according to each example, a distance between adjacent lens units changes during focusing from infinity to a close distance. The lens unit may include one or more lenses. The lens unit may include an aperture stop.

In each lens sectional view, Bi represents an i-th lens unit (where i is a natural number) counted from the object side in the optical system.

SP represents an aperture stop. The aperture stop SP determines (restricts) a light beam at a minimum F-number (Fno) (maximum aperture). IP represents an image plane. In a case where the zoom lens according to each example is used as an imaging optical system of a digital still camera or video camera, an imaging plane of a solid-state image sensor (photoelectric conversion element) such as a CCD sensor or CMOS sensor is disposed. In a case where the zoom lens according to each example is used as an imaging optical system of a film-based camera, a photosensitive surface corresponding to a film surface is placed on the image plane IP.

An arrow in the optical axis direction indicates a moving direction of the focus lens unit movable during focusing from infinity to a close distance.

FIGS. 2, 5, 8, and 11 are longitudinal aberration diagrams of the optical systems according to Examples 1 to 4 in the in-focus states at infinity, respectively. FIGS. 3, 6, 9, and 12 are longitudinal aberration diagrams of the optical systems according to Examples 1 to 4 in the in-focus states at a close distance, respectively.

In a spherical aberration diagram, Fno represents an F-number. A spherical aberration diagram illustrates spherical aberration amounts for the d-line (wavelength 587.56 nm), the g-line (wavelength 435.84 nm), the C-line (wavelength 656.27 nm), and the F-line (wavelength 486.13 nm). In an astigmatism diagram, S represents an astigmatism amount on a sagittal image plane for the d-line, and M represents an astigmatism amount on a meridional image surface for the d-line. A distortion diagram illustrates a distortion amount for the d-line. A chromatic aberration diagram illustrates a chromatic aberration amount for the g-line, C-line (wavelength 656.27 nm), and F-line (wavelength 486.13 nm). ω is an imaging half angle of view (°) (angle of view in paraxial calculation), and represents an angle of view based on the ray tracing value.

A description will now be given of the characteristic configuration of the optical system according to each example.

The optical system according to each example includes a first lens unit B1 having positive refractive power, a second lens unit B2 having positive refractive power, a third lens unit B3, a fourth lens unit B4 having positive refractive power, and a fifth lens unit B5 having negative refractive power. In the optical system according to each example, a distance between adjacent lens units changes during focusing from infinity to a close distance.

The first lens unit B1 having positive refractive power can convert emitted light into condensed light, and reduce the lens diameter and weight of the second lens unit B2.

The second lens unit B2 and the fourth lens unit B4 function as a focus lens unit configured to move during focusing, and during focusing from infinity to a close distance, the second lens unit B2 and the fourth lens unit B4 move toward the object side.

Simultaneously moving the second lens unit B2 and the fourth lens unit B4 during focusing can suppress fluctuations in the spherical aberration of the entire system during focusing. The second lens unit B2 having positive refractive power can reduce the diameters of the subsequent lens units. Thereby, the weight of the fourth lens unit B4 disposed behind the second lens unit B2 can be reduced, and high-speed and quiet driving of the focus lens unit can be achieved. In a case where the second lens unit B2 has negative refractive power and has a focusing function, the second lens unit B2 is moved in the image direction during focusing. In order to move the second lens unit B2 in the image direction, the second lens unit B2 is disposed as close to the object side as possible, but then the diameter and weight of the second lens unit B2 become larger. If the refractive power of the first lens unit B1 is increased in order to reduce the diameter of the second lens unit B2, the spherical aberration amount generated in the first lens unit B1 becomes larger, and spherical aberration of the entire optical system cannot be fully corrected.

If the fourth lens unit B4 has negative refractive power, the diameter and weight of the fourth lens unit B4 become larger than those of the fourth lens unit B4 having positive refractive power. This is because the fourth lens unit B4 receives the condensed light emitted from the third lens unit B3, and the air gap between the third lens unit B3 and the fourth lens unit B4 is narrowed so as to move the fourth lens unit B4 toward the image side during focusing from infinity to a close distance. If the fourth lens unit B4 is moved toward the object side, the diameter of the fourth lens unit B4 is increased in order to receive the uncondensed light beam.

At least one of the second lens unit B2 and the fourth lens unit B4 includes two or more lenses. Thereby, aberrations can be suppressed.

The first lens unit B1 includes two or more negative lenses. This configuration contributes to widening the angle of the entire optical system and suppresses distortion that occurs in providing the refractive power for the wide angle.

As described above, satisfying the above configuration, the optical system according to each example can achieve both weight reduction of the focus lens unit and suppression of aberration fluctuations during focusing.

A description will now be given of conditions that may be satisfied in the optical system according to each example. The optical system according to each embodiment may satisfy one or more of the following inequalities (1) to (8).

Here, f is a focal length of the optical system in the in-focus state at infinity. f2 is a focal length of the second lens unit B2. f4 is a focal length of the fourth lens unit B4. f5 is a focal length of the fifth lens unit B5. DT is a distance on the optical axis from a lens surface on the object side of the first lens unit B1 to a lens surface on the image side of a lens unit disposed closest to the image plane in the in-focus state at infinity. D12 is a distance on the optical axis from a lens surface on the image side of the first lens unit B1 to a lens surface on the object side of the second lens unit B2 in the in-focus state at infinity. D34 is a distance on the optical axis from a lens surface on the image side of the third lens unit B3 to a lens surface on the object side of the fourth lens unit B4 in the in-focus state at infinity. TTL is an overall optical length of the optical system in the in-focus state at infinity. Here, the overall optical length is a distance on the optical axis from a lens surface closest to the object to the image plane of the optical system in the in-focus state at infinity. T2 is a thickness on the optical axis of the second lens unit B2. T4 is a thickness on the optical axis of the fourth lens unit B4.

$$0.30 < f4/f < 4.80 \tag{1}$$

$$0.70 < f2/f < 26.80 \tag{2}$$

$$0.05 < f4/f2 < 1.50 \tag{3}$$

$$-25.80 < f5/f < -0.90 \tag{4}$$

$$0.008 < D12/DT < 0.210 \tag{5}$$

$$0.020 < D34/DT < 0.530 \tag{6}$$

$$0.004 < T2/TTL < 0.120 \tag{7}$$

$$0.040 < T4/TTL < 0.590 \tag{8}$$

Inequality (1) defines a ratio of the focal length of the fourth lens unit B4 to the focal length of the optical system in the in-focus state at infinity. In a case where the value becomes higher than the upper limit of inequality (1), the refractive power of the fourth lens unit B4 becomes too weak. If the refractive power of the fourth lens unit B4 becomes too weak, the light condensing power becomes weaker and the entire optical system becomes longer. In a case where the value becomes lower than the lower limit of inequality (1), the refractive power of the fourth lens unit B4 becomes too strong. In a case where the refractive power of the fourth lens unit becomes too strong. If the refractive power of the fourth lens unit becomes too strong, the light condensing power becomes stronger, but the generated aberration amount becomes too large, and the entire optical system cannot obtain excellent resolution. Furthermore, in a case where the number of lenses is increased in order to suppress the generated aberrations, the fourth lens unit B4 becomes heavier, and the driving speed and quietness lower.

Inequality (2) defines a ratio of the focal length of the second lens unit B2 to the focal length of the optical system in the in-focus state at infinity. In a case where the value becomes higher than the upper limit of inequality (2), the refractive power of the second lens unit B2 becomes too weak. If the refractive power of the second lens unit B2 becomes too weak, the moving amount of the second lens unit B2 or the fourth lens unit B4 increases, and the optical system becomes longer. In a case where the value becomes lower than the lower limit of inequality (2), the refractive power of the second lens unit B2 becomes too strong. If the refractive power of the second lens unit B2 becomes too strong, the number of lenses in the second lens unit B2 is increased to suppress generated aberrations.

Inequality (3) defines a ratio of the focal length of the fourth lens unit B4 to the focal length of the second lens unit B2. In a case where the value becomes higher than the upper limit value or lower than the lower limit value of inequality (3), the second lens unit B2 and the fourth lens unit B4, which form the focus lens unit, have poor balance, and aberration fluctuations cannot be satisfactorily suppressed.

Inequality (4) defines a ratio of the focal length of the fifth lens unit B5 to the focal length of the optical system in the in-focus state at infinity. In a case where the value becomes higher than the upper limit of inequality (4), the refractive power of the fifth lens unit B5 becomes too weak. In a case where the refractive power of the fifth lens unit B5 becomes too weak, the function of canceling out the distortion generated in the first lens unit B1 lowers, and furthermore the fourth lens unit B4 cannot have refractive power. In a case where the value becomes lower than the lower limit of inequality (4), the refractive power of the fifth lens unit B5 becomes too strong. In a case where the refractive power of the fifth lens unit B5 becomes too strong, the refractive power of the fourth lens unit B4 is increased and it becomes difficult to suppress aberrations occurring within the fourth lens unit B4.

Inequality (5) defines a ratio of the distance between the first lens unit B1 and the second lens unit B2 to the distance between the first lens unit B1 and the lens unit located closest to the image plane. In a case where the value becomes higher than the upper limit of inequality (5), the distance between the first lens unit B1 and the second lens unit B2 is excessively secured relative to the moving amount during focusing. In a case where the distance between the first lens unit B1 and the second lens unit B2 is too wide, other lens units are thinner and a necessary number of lenses cannot be disposed. In a case where the value becomes lower than the lower limit of inequality (5), the distance between the first lens unit B1 and the second lens unit B2 cannot be sufficiently secured for the moving amount during focusing, and thereby the aberrations generated within the fourth lens unit B4 during focusing cannot be satisfactorily corrected.

Inequality (6) defines a ratio of the distance between the third lens unit B3 and the fourth lens unit B4 to the distance between the first lens unit B1 and the lens unit located closest to the image plane. In a case where the value becomes higher than the upper limit of inequality (6), the distance between the third lens unit B3 and the fourth lens unit B4 is excessively secured relative to the moving amount during focusing. In a case where the distance between the third lens unit B3 and the fourth lens unit B4 becomes too wide, other lens units are thinner and a necessary number of lenses to correct aberrations cannot be disposed. In a case where the value becomes lower than the lower limit of inequality (6), the distance between the third lens unit B3 and the fourth lens unit B4 cannot be sufficiently secured for the moving amount during focusing. Thereby, the shortest imaging distance cannot be sufficiently secured.

Inequality (7) defines a ratio of the thickness of the second lens unit B2 to the overall optical length of the optical system in the in-focus state at infinity. In a case where the value becomes higher than the upper limit of inequality (7), the second lens unit B2 becomes too thick. If the second lens unit B2 becomes too thick, other lens units are thinner and a necessary number of lenses to correct aberrations cannot be disposed. Furthermore, in a case where the second lens unit B2 becomes too thick, the second lens unit B2 becomes heavy, and it becomes difficult to drive the second lens unit B2 at a high speed. In a case where the value becomes lower than the lower limit of inequality (7), the second lens unit B2 becomes too thin and the focusing function of the second lens unit B2 lowers.

Inequality (8) defines a ratio of the thickness of the fourth lens unit B4 to the overall optical length of the optical system in the in-focus state at infinity. In a case where the value becomes higher than the upper limit of inequality (8), the fourth lens unit B4 becomes too thick. If the fourth lens unit B4 becomes too thick, other lens units are thinner and a necessary number of lenses to correct aberrations cannot be disposed. Moreover, in a case where the fourth lens unit B4 becomes too thick, the fourth lens unit B4 becomes heavy, and it becomes difficult to drive the fourth lens unit B4 at a high speed. In a case where the value becomes lower than the lower limit of inequality (8), the fourth lens unit B4 becomes too thin, and the focusing function of the fourth lens unit B4 lowers or it becomes difficult to suppress aberrations occurring within the fourth lens unit B4.

Inequalities (1) to (8) may be replaced with inequalities (1a) to (8a) below:

$$0.50 < f4/f < 3.20 \tag{1a}$$

$$1.20 < f2/f < 17.90 \tag{2a}$$

$$0.08 < f4/f2 < 1.00 \tag{3a}$$

$$-17.20 < f5/f < -1.50 \tag{4a}$$

$$0.010 < D12/DT < 0.140 \tag{5a}$$

$$0.040 < D34/DT < 0.360 \tag{6a}$$

$$0.007 < T2/TTL < 0.079 \tag{7a}$$

$$0.070 < T4/TTL < 0.390 \tag{8a}$$

Inequalities (1) to (8) may be replaced with inequalities (1b) to (8b) below:

$$0.90 < f4/f < 1.80 \tag{1b}$$

$$2.20 < f2/f < 9.90 \tag{2b}$$

$$0.10 < f4/f2 < 0.60 \tag{3b}$$

$$-9.50 < f5/f < -2.70 \tag{4b}$$

$$0.020 < D12/DT < 0.080 \tag{5b}$$

$$0.070 < D34/DT < 0.200 \tag{6b}$$

$$0.014 < T2/TTL < 0.044 \tag{7b}$$

$$0.120 < T4/TTL < 0.220 \tag{8b}$$

A detailed description will be given of the optical system according to each example.

Example 1

The optical system according to Example 1 includes, in order from the object side to the image side, a first lens unit B1 having positive refractive power, a second lens unit B2 having positive refractive power, a third lens unit B3 having negative refractive power, a fourth lens unit B4 having positive refractive power, and a fifth lens unit B5 having negative refractive power. The second lens unit B2 and the fourth lens unit B4 function as a focus lens unit, and during focusing from infinity to a close distance, both the second lens unit B2 and the fourth lens unit B4 move toward the object side.

The first lens unit B1 is fixed relative to the image plane IP during focusing from infinity to the close distance.

In the optical system according to Example 1, the first lens unit B1 has five lenses, the first to fifth lenses G1 to G5, in order from the object side to the image side.

The first lens G1 has negative refractive power. This contributes to widening the angle of the entire optical system. The first lens G1 has an aspherical surface. Thereby, the distortion amount generated can be suppressed.

The second lens G2 has negative refractive power. This contributes to widening the angle of the entire optical system. In a case where either the first lens G1 or the second lens G2 is lost, the distortion that occurs in providing the refractive power for widening the angle becomes too large.

The third lens G3 has positive refractive power, and the fourth lens G4 has negative refractive power. The third lens G3 and the fourth lens G4 are cemented, and form a cemented lens having positive refractive power as a whole. As the angle becomes wider, the on-axis light beam emitted from the second lens G2 becomes diverging light. Thus, the light beam is converged with strong power, but if the light is converged by a single lens, large longitudinal chromatic aberration and lateral chromatic aberration occur.

The fifth lens G5 has positive refractive power. If the light beam is converged by the cemented lens consisting of the third lens G3 and the fourth lens G4, large spherical aberration occurs. The fifth lens G5 having positive refractive power can condense the on-axis light beam while suppressing the spherical aberration.

The second lens unit B2 moves simultaneously with the fourth lens unit B4 during focusing from infinity to a close distance.

In the optical system according to Example 1, the second lens unit B2 consists of single sixth lens G6 having positive refractive power. The lens surface on the object side of the sixth lens G6 is convex, and the lens surface on the image side of the sixth lens G6 is concave. Thereby, the spherical aberration amount generated in the in-focus state at infinity can be suppressed.

The third lens unit B3 is fixed relative to the image plane IP during focusing from infinity to the close distance.

In the optical system according to Example 1, the third lens unit B3 consists of single seventh lens G7 having negative refractive power. The lens surface on the object side of the seventh lens G7 is convex, and the lens surface on the image side of the seventh lens G7 is concave. Thereby, spherical aberration is suppressed.

The aperture stop SP is disposed between the second lens unit B2 and the third lens unit B3, and is fixed relative to the image plane IP during focusing from infinity to the close distance. This contributes to reducing the weight of the lens units that move during focusing.

The fourth lens unit B4 moves simultaneously with the second lens unit B2 during focusing from infinity to the close distance.

In the optical system according to Example 1, the fourth lens unit B4 has four lenses, the eighth to eleventh lenses G8 to G11, in order from the object side to the image side.

The eighth lens G8 has positive refractive power, and the ninth lens G9 has negative refractive power. The eighth lens G8 and the ninth lens G9 are cemented, and form a cemented lens having negative refractive power as a whole. The lens surface on the object side of the eighth lens G8 has a concave shape. Thereby, aberrations in the positive lens in the fourth lens unit B4 are corrected, and aberrations in the entire fourth lens unit B4 are suppressed. The cemented lens consisting of the eighth lens G8 and the ninth lens G9 allows the eighth lens G8 and the ninth lens G9 to have a strong negative refractive power as a whole while suppressing the occurrence of chromatic aberration.

The tenth lens G10 has positive refractive power. Using a material having low dispersion and high anomalous dispersion for the tenth lens G10 can suppress chromatic aberration of the entire optical system.

The eleventh lens G11 has positive refractive power. The eleventh lens G11 has an aspherical surface. This configuration can suppress spherical aberration while increasing the refractive power of the eleventh lens G11. In addition, image plane is corrected by placing an aspherical surface at a position where the off-axis principal rays are sufficiently separated, and by shaping the aspherical surface into a shape whose power weakens toward the periphery.

The fifth lens unit B5 is fixed relative to the image plane IP during focusing from infinity to the close distance and has negative refractive power as a whole. This configuration can increase the refractive power of the fourth lens unit B4. The fifth lens unit B5 having negative refractive power and located at a position where the off-axis principal ray is high can correct lateral chromatic aberration and distortion generated in the first lens unit B1. This eliminates the need to completely suppress distortion within the first lens unit B1, and can reduce the number of lenses disposed on the object side and the size of the entire optical system.

In the optical system according to Example 1, the fifth lens unit B5 has four lenses, the twelfth to fifteenth lenses G12 to G15, in order from the object side to the image side.

The twelfth lens G12 has positive refractive power, and the thirteenth lens G13 has negative refractive power. The twelfth lens G12 and the thirteenth lens G13 are cemented, and form a cemented lens having negative refractive power as a whole. The cemented lens consisting of the twelfth lens G12 and the thirteenth lens G13 mainly suppresses lateral chromatic aberration. This can increase the refractive power of the fifth lens unit B5, and the strong negative refractive power of the fifth lens unit B5 can increase the positive refractive power of the fourth lens unit B4.

The fourteenth lens G14 has negative refractive power, and the fifteenth lens G15 has positive refractive power. The fourteenth lens G14 and the fifteenth lens G15 are cemented, and form a cemented lens having negative refractive power as a whole. The cemented lens consisting of the fourteenth lens G14 and the fifteenth lens G15 mainly suppresses lateral chromatic aberration. The cemented lens consisting of the fourteenth lens G14 and the fifteenth lens G15 shares refractive power with the cemented lens consisting of the twelfth lens G12 and the thirteenth lens G13.

Example 2

The optical system according to Example 2 includes, in order from the object side to the image side, a first lens unit B1 having positive refractive power, a second lens unit B2 having positive refractive power, a third lens unit B3 having negative refractive power, a fourth lens unit B4 having positive refractive power, and a fifth lens unit B5 having negative refractive power. The second lens unit B2 and the fourth lens unit B4 function as a focus lens unit, and during focusing from infinity to a close distance, both the second lens unit B2 and the fourth lens unit B4 move toward the object side.

In the optical system according to Example 2, in comparison with the optical system according to Example 1, the cemented lens disposed closest to the image plane is a single lens (fixed focal length lens).

Example 3

The optical system according to Example 3 includes, in order from the object side to the image side, a first lens unit B1 having positive refractive power, a second lens unit B2 having positive refractive power, a third lens unit B3 having negative refractive power, a fourth lens unit B4 having positive refractive power, and a fifth lens unit B5 having negative refractive power. The second lens unit B2 and the fourth lens unit B4 function as a focus lens unit, and during focusing from infinity to a close distance, both the second lens unit B2 and the fourth lens unit B4 move toward the object side.

In the optical system according to Example 3, in comparison with the optical systems according to Examples 1 and 2, the angle of view is further widened by increasing the number of negative lenses in the first lens unit B1.

Example 4

The optical system according to Example 4 includes, in order from the object side to the image side, a first lens unit B1 having positive refractive power, a second lens unit B2 having positive refractive power, a third lens unit B3 having positive refractive power, a fourth lens unit B4 having positive refractive power, and a fifth lens unit B5 having negative refractive power. The second lens unit B2 and the fourth lens unit B4 function as a focus lens unit, and during focusing from infinity to a close distance, both the second lens unit B2 and the fourth lens unit B4 move toward the object side.

In the optical system according to Example 4, the negative lens disposed in the first lens unit B1 is aspheric in comparison with the optical system according to Example 3, thereby suppressing distortion and further widening the angle of view.

Numerical values corresponding to Examples 1 to 4 will be illustrated below.

In the surface data in each numerical example, r represents a radius of curvature of each optical surface, and d (mm) represents an on-axis distance (distance on the optical axis) between m-th and (m+1)-th surfaces, where m is a surface number counted from the light incident side. nd represents a refractive index of each optical member for the d-line, and vd represents the Abbe number of the optical member based on the d-line. An Abbe number of a certain material is represented as follows:

$$vd = (Nd - 1)/(NF - NC)$$

where Nd, NF, and NC are refractive indexes of the d-line (587.6 nm), F-line (486.1 nm), and C-line (656.3 nm) in the Fraunhofer line. $\Phi$ is an effective diameter (mm).

In each numerical example, d, a focal length (mm), an F-number, and a half angle of view (°) are all values in a case where the optical system according to each example is in an in-focus state on an infinity object. Back focus is a distance on the optical axis from the final lens surface (the lens surface closest to the image plane) of the optical system to the paraxial image plane expressed in terms of air equivalent length. An overall lens length is a distance on the optical axis from the first lens surface (lens surface closest to the object) to the final lens surface. The lens unit may include one or more lenses.

If the optical surface is aspherical, an asterisk * is added to the right side of the surface number. The aspherical shape is expressed as follows:

$$x = (h^2/R)/[1 + \{1 - (1 + k)(h/R)^2\}^{1/2}] +$$
$$A4 \times h^4 + A6 \times h^6 + A8 \times h^8 + A10 \times h^{10} + A12 \times h^{12}$$

where x is a displacement amount from the surface vertex in the optical axis direction, h is a height from the optical axis in the direction perpendicular to the optical axis, R is a paraxial radius of curvature, k is a conical constant, and A4, A6, A8, A10, and A12 are aspherical coefficients of each order. "e±XX" in each aspherical coefficient means "×10±XX."

A eighteenth surface in Table 1 below is an unillustrated flare cut surface. Tenth and nineteenth surfaces in Table 3 below are unillustrated flare cut surfaces. Tenth and twenty-first surfaces in Table 5 below are flare cut surfaces.

Numerical Example 1

TABLE 1

| Surface No. | r [mm] | d [mm] | nd | vd | $\Phi$ [mm] |
|---|---|---|---|---|---|
| 1 | 141.971 | 1.900 | 1.583 | 59.38 | 38.522 |
| *2 | 30.786 | 10.878 | | | 33.600 |
| 3 | −32.445 | 1.050 | 1.516 | 64.14 | 32.937 |
| 4 | 79.633 | 1.294 | | | 33.494 |
| 5 | 70.961 | 12.194 | 1.764 | 48.49 | 34.046 |
| 6 | −23.782 | 1.400 | 1.855 | 24.80 | 33.976 |

TABLE 1-continued

| Surface No. | r [mm] | d [mm] | nd | vd | Φ [mm] |
|---|---|---|---|---|---|
| 7 | −59.990 | 0.200 | | | 34.446 |
| 8 | 104.120 | 4.816 | 2.001 | 25.46 | 35.776 |
| 9 | −104.120 | 4.789 | | | 35.737 |
| 10 | 37.327 | 3.399 | 1.595 | 67.74 | 31.697 |
| 11 | 64.923 | 1.965 | | | 30.675 |
| 12 | 64.445 | 1.300 | 1.770 | 29.74 | 29.451 |
| 13 | 37.607 | 4.847 | | | 28.106 |
| (sp)14 | ∞ | 11.058 | | | 27.226 |
| 15 | −26.784 | 4.171 | 1.497 | 81.54 | 23.801 |
| 16 | −17.641 | 1.100 | 1.770 | 29.74 | 23.963 |
| 17 | −799.000 | 0.200 | | | 25.825 |
| 18 | ∞ | 0.000 | | | 26.105 |
| 19 | 65.916 | 8.549 | 1.538 | 74.70 | 29.753 |
| 20 | −29.612 | 0.350 | | | 31.541 |
| *21 | 108.651 | 7.059 | 1.804 | 46.58 | 34.667 |
| *22 | −46.890 | 2.350 | | | 35.514 |
| 23 | 129.995 | 6.813 | 2.001 | 29.13 | 35.536 |
| 24 | −45.734 | 1.000 | 1.770 | 29.74 | 35.255 |
| 25 | 45.734 | 6.330 | | | 33.190 |
| 26 | −55.236 | 1.100 | 1.613 | 44.27 | 33.265 |
| 27 | 255.135 | 2.229 | 1.923 | 20.88 | 34.575 |
| 28 | −255.135 | 15.447 | | | 34.821 |

TABLE 2

| Aspheric Data | 2nd Surface | 21st Surface | 22nd Surface |
|---|---|---|---|
| r | 3.078591E+01 | 1.086509E+02 | −4.689015E+01 |
| k | 0.000000E+00 | 0.000000E+00 | 0.000000E+00 |
| A4 | 1.842516E−06 | −5.695313E−06 | 3.990470E−06 |
| A6 | −5.037985E−09 | −5.371583E−10 | −9.941354E−10 |
| A8 | 8.297148E−11 | −4.069557E−13 | 6.139883E−12 |
| A10 | −4.482158E−13 | −6.560588E−15 | 0.000000E+00 |
| A12 | 1.281176E−15 | 0.000000E+00 | 0.000000E+00 |
| A14 | −1.393938E−18 | 0.000000E+00 | 0.000000E+00 |
| Focal Length [mm] | | | 34.0 |
| Fno | | | 1.45 |
| Overall Lens Length [mm] | | | 102.341 |
| Back Focus [mm] | | | 15.447 |
| Maximum Image Height [mm] | | | 20.03 |
| Half Angle of View (°) | | | 30.5 |

Numerical Example 2

TABLE 3

| Surface No. | r [mm] | d [mm] | nd | vd | Φ [mm] |
|---|---|---|---|---|---|
| 1 | 360.451 | 1.900 | 1.583 | 59.38 | 38.390 |
| *2 | 32.174 | 11.511 | | | 33.541 |
| 3 | −30.402 | 1.050 | 1.516 | 64.14 | 32.652 |
| 4 | 106.610 | 0.500 | | | 33.703 |
| 5 | 75.064 | 11.371 | 1.764 | 48.49 | 34.154 |
| 6 | −25.535 | 1.400 | 1.855 | 24.80 | 34.197 |
| 7 | −50.760 | 0.200 | | | 34.692 |
| 8 | 146.103 | 3.873 | 2.001 | 25.46 | 35.206 |
| 9 | −143.190 | 0.000 | | | 35.205 |
| 10 | ∞ | 3.800 | | | 34.931 |
| 11 | 34.518 | 4.646 | 1.595 | 67.74 | 32.914 |
| 12 | 103.070 | 1.500 | | | 31.973 |
| 13 | 51.466 | 1.500 | 1.770 | 29.74 | 30.219 |
| 14 | 31.460 | 6.316 | | | 28.478 |
| (SP)15 | ∞ | 11.810 | | | 27.298 |
| 16 | −26.046 | 2.759 | 1.497 | 81.54 | 23.658 |
| 17 | −20.122 | 1.100 | 1.770 | 29.74 | 23.804 |
| 18 | −779.954 | 0.200 | | | 25.214 |
| 19 | ∞ | 0.558 | | | 25.550 |
| 20 | 59.443 | 9.185 | 1.497 | 81.54 | 30.836 |
| 21 | −31.899 | 2.186 | | | 32.795 |
| *22 | 89.503 | 7.114 | 1.804 | 46.53 | 37.179 |
| *23 | −56.118 | 1.500 | | | 37.945 |
| 24 | 69.336 | 7.684 | 2.001 | 29.13 | 38.174 |

TABLE 3-continued

| Surface No. | r [mm] | d [mm] | nd | vd | Φ [mm] |
|---|---|---|---|---|---|
| 25 | −58.895 | 1.100 | 1.770 | 29.74 | 37.662 |
| 26 | 34.256 | 6.839 | | | 34.145 |
| 27 | −83.829 | 1.500 | 1.613 | 44.27 | 34.223 |
| 28 | −262.530 | 15.444 | | | 34.900 |

TABLE 4

| Aspheric Data | 2nd Surface | 22nd Surface | 23rd Surface |
|---|---|---|---|
| r | 3.217448E+01 | 8.950277E+01 | −5.611754E+01 |
| k | 0.000000E+00 | 0.000000E+00 | 0.000000E+00 |
| A4 | 1.697231E−06 | −4.587706E−06 | 3.931361E−06 |
| A6 | −9.598092E−09 | 1.115432E−09 | 1.682398E−09 |
| A8 | 1.251928E−10 | −8.943226E−12 | −8.682252E−12 |
| A10 | −6.393750E−13 | −4.870968E−15 | 5.837280E−15 |
| A12 | 1.679648E−15 | 0.000000E+00 | 0.000000E+00 |
| A14 | −1.671035E−18 | 0.000000E+00 | 0.000000E+00 |
| Focal Length [mm] | | | 34.0 |
| Fno | | | 1.46 |
| Overall Lens Length [mm] | | | 103.101 |
| Back Focus [mm] | | | 15.444 |
| Maximum Image Height [mm] | | | 20.03 |
| Half Angle of View (°) | | | 30.5 |

Numerical Example 3

TABLE 5

| Surface No. | r [mm] | d [mm] | nd | vd | Φ [mm] |
|---|---|---|---|---|---|
| 1 | 83.765 | 1.400 | 1.487 | 70.23 | 43.877 |
| 2 | 23.000 | 4.899 | | | 35.164 |
| 3 | 43.564 | 1.200 | 1.497 | 81.54 | 34.834 |
| 4 | 23.747 | 17.694 | | | 31.596 |
| 5 | −23.433 | 1.296 | 1.497 | 81.54 | 27.745 |
| 6 | −74.680 | 0.149 | | | 28.499 |
| 7 | 190.780 | 8.982 | 1.720 | 50.23 | 28.623 |
| 8 | −20.000 | 1.300 | 1.855 | 24.80 | 28.643 |
| 9 | −45.590 | 0.307 | | | 31.049 |
| 10 | ∞ | 0.200 | | | 32.125 |
| 11 | 308.809 | 4.670 | 2.001 | 29.13 | 32.346 |
| 12 | −56.776 | 2.967 | | | 32.573 |
| 13 | 34.354 | 3.217 | 1.595 | 67.74 | 29.369 |
| 14 | 61.105 | 3.198 | | | 28.447 |
| (SP)15 | ∞ | 0.500 | | | 27.480 |
| 16 | 37.765 | 1.300 | 1.613 | 44.27 | 25.726 |
| 17 | 23.405 | 12.534 | | | 24.126 |
| 18 | −30.562 | 4.711 | 1.439 | 94.66 | 21.424 |
| 19 | −15.938 | 1.100 | 1.770 | 29.74 | 21.379 |
| 20 | −65.923 | 0.000 | | | 23.954 |
| 21 | ∞ | 0.199 | | | 25.707 |
| 22 | 55.261 | 9.114 | 1.439 | 94.66 | 29.152 |
| 23 | −27.499 | 0.348 | | | 30.818 |
| *24 | 173.130 | 5.671 | 1.804 | 46.58 | 33.153 |
| *25 | −51.850 | 2.449 | | | 33.771 |
| 26 | 97.004 | 6.924 | 2.001 | 29.13 | 34.175 |
| 27 | −44.738 | 1.150 | 1.770 | 29.74 | 33.870 |
| 28 | 44.517 | 6.169 | | | 31.797 |
| 29 | −46.599 | 1.300 | 1.770 | 29.74 | 31.834 |
| 30 | −81.144 | 12.487 | | | 32.711 |

TABLE 6

| Aspheric Data | 24th Surface | 25th Surface |
|---|---|---|
| r | 1.731298E+02 | −5.185033E+01 |
| k | 0.000000E+00 | 0.000000E+00 |
| A4 | −5.806869E−06 | 4.107567E−06 |
| A6 | 1.438125E−09 | 1.739424E−09 |

TABLE 6-continued

| Aspheric Data | 24th Surface | 25th Surface |
|---|---|---|
| A8 | 3.668843E−11 | 4.037293E−11 |
| A10 | −8.190791E−14 | −5.003848E−14 |
| A12 | −1.818806E−17 | −5.128412E−17 |
| A14 | 0.000000E+00 | 0.000000E+00 |
| Focal Length [mm] | | 23.5 |
| Fno | | 1.46 |
| Overall Lens Length [mm] | | 104.949 |
| Back Focus [mm] | | 12.487 |
| Maximum Image Height [mm] | | 18.62 |
| Half Angle of View (°) | | 38.4 |

Numerical Example 4

TABLE 7

| Surface No. | r [mm] | d [mm] | nd | vd | Φ [mm] |
|---|---|---|---|---|---|
| 1 | 53.345 | 2.300 | 1.583 | 59.38 | 44.303 |
| *2 | 20.063 | 6.914 | | | 34.125 |
| 3 | 55.132 | 1.000 | 1.497 | 81.54 | 33.566 |
| 4 | 21.889 | 12.115 | | | 29.751 |
| 5 | −28.009 | 1.200 | 1.497 | 81.54 | 28.519 |
| 6 | 186.975 | 0.200 | | | 28.985 |
| 7 | 55.468 | 9.453 | 1.804 | 46.53 | 29.309 |
| 8 | −24.295 | 1.050 | 1.847 | 23.78 | 28.949 |
| 9 | −70.642 | 0.200 | | | 28.536 |
| 10 | 202.287 | 2.403 | 2.001 | 29.13 | 27.354 |
| 11 | −125.144 | 7.089 | | | 27.449 |
| 12 | 58.520 | 1.839 | 1.595 | 67.74 | 26.884 |
| 13 | 124.475 | 2.716 | | | 26.673 |
| (SP)14 | ∞ | 1.782 | | | 26.252 |
| 15 | 395.702 | 3.263 | 1.954 | 32.32 | 25.832 |
| 16 | −52.934 | 1.000 | 1.604 | 20.81 | 25.626 |
| 17 | −34.417 | 0.996 | 1.613 | 44.27 | 25.596 |
| 18 | 153.099 | 8.337 | | | 24.497 |
| 19 | −27.375 | 3.962 | 1.439 | 94.66 | 22.602 |
| 20 | −16.142 | 0.900 | 1.770 | 29.74 | 22.681 |
| 21 | −74.284 | 0.150 | | | 24.406 |
| 22 | 43.364 | 6.929 | 1.497 | 81.54 | 25.696 |
| 23 | −30.417 | 0.150 | | | 25.899 |
| *24 | 233.926 | 4.767 | 1.804 | 46.58 | 27.213 |
| *25 | −39.719 | 1.999 | | | 27.947 |
| 26 | 153.817 | 4.496 | 1.804 | 46.53 | 28.325 |
| 27 | −43.791 | 1.000 | 1.770 | 29.74 | 28.264 |
| 28 | 32.158 | 6.596 | | | 27.909 |
| 29 | 603.874 | 1.000 | 1.613 | 44.27 | 30.637 |
| 30 | 34.319 | 5.869 | 1.954 | 32.32 | 32.763 |
| 31 | 5224.302 | 15.526 | | | 33.004 |

TABLE 8

| Aspheric Data | 2nd Surface | 24th Surface | 25th Surface |
|---|---|---|---|
| r | 2.006287E+01 | 2.339257E+02 | −3.971868E+01 |
| k | 0.000000E+00 | 0.000000E+00 | 0.000000E+00 |
| A4 | −2.464849E−06 | −1.454983E−05 | 3.345623E−06 |
| A6 | −7.189256E−09 | −3.772205E−09 | −1.979595E−09 |
| A8 | −9.776918E−12 | 1.829933E−11 | 1.910633E−11 |
| A10 | 2.265032E−14 | 1.771958E−13 | 2.159794E−13 |
| A12 | −1.680768E−16 | 0.000000E+00 | 0.000000E+00 |
| A14 | 0.000000E+00 | 0.000000E+00 | 0.000000E+00 |
| Focal Length [mm] | | | 20.6 |
| Fno | | | 1.46 |
| Overall Lens Length [mm] | | | 101.674 |
| Back Focus [mm] | | | 15.526 |
| Maximum Image Height [mm] | | | 18.68 |
| Half Angle of View (°) | | | 42.2 |

TABLE 9 summarizes various values of each numerical example.

TABLE 9

| | Example 1 | Example 2 | Example 3 | Example 4 |
|---|---|---|---|---|
| f4/f | 1.104 | 1.214 | 1.596 | 1.583 |
| f2/f | 4.153 | 2.502 | 5.369 | 8.914 |
| f4/f2 | 0.266 | 0.485 | 0.297 | 0.178 |
| f5/f | −3.009 | −3.881 | −5.399 | −8.567 |
| D12/DT | 0.047 | 0.037 | 0.028 | 0.070 |
| D34/DT | 0.155 | 0.176 | 0.119 | 0.082 |
| T2/TTL | 0.029 | 0.039 | 0.027 | 0.016 |
| T4/TTL | 0.182 | 0.195 | 0.180 | 0.144 |

Image Pickup Apparatus

Figure 13:
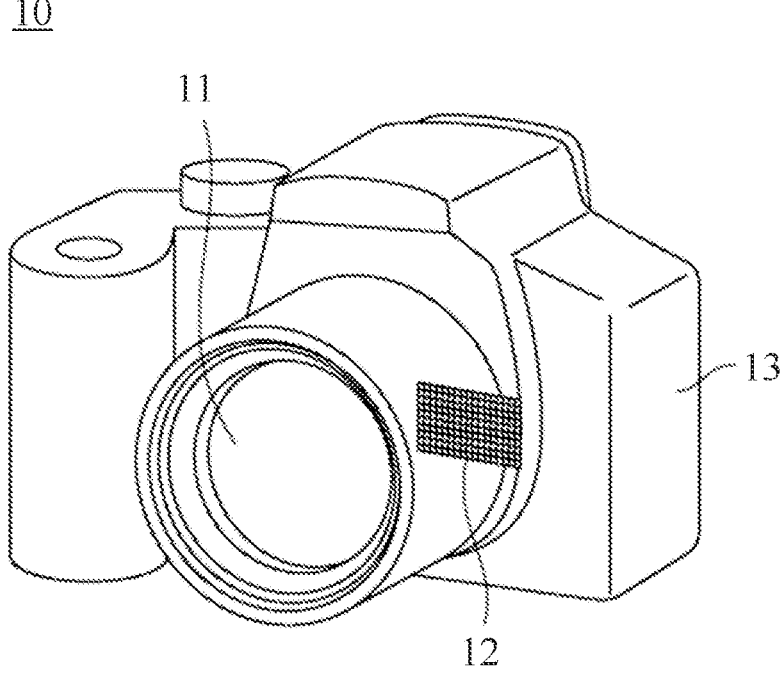
FIG. 13 is a schematic diagram of an image pickup apparatus.

Referring now to FIG. 13, a description will be given of an example of a digital still camera (image pickup apparatus) 10 using the optical system according to each example as an imaging optical system. FIG. 13 illustrates the configuration of the image pickup apparatus 10. The image pickup apparatus 10 includes a camera body 13, a lens apparatus 11 including the optical system according to any one of Examples 1 to 4 described above, and an image sensor (light receiving element) 12 configured to photoelectrically convert an image formed by the optical system. The image sensor 12 can use an image sensor such as a CCD sensor or a CMOS sensor. The lens apparatus 11 and the camera body 13 may be integrated with each other or attachable to and detachable from each other. The camera body 13 may be a so-called single-lens reflex camera with a quick turn mirror, or a so-called mirrorless camera without a quick turn mirror.

Thus, applying the optical system according to each example to the image pickup apparatus 10 such as a digital still camera can provide the image pickup apparatus 10 having the optical system in which both the weight of the focus lens unit and aberration fluctuations during focusing are reduced.

The image pickup apparatus 10 according to this embodiment is not limited to the digital still camera illustrated in FIG. 13, but can be applied to various image pickup apparatuses such as a broadcasting camera, a film-based camera, and a surveillance camera.

While the disclosure has described example embodiments, it is to be understood that some embodiments are not limited to the disclosed embodiments. The scope of the following claims is to be accorded the broadest interpretation so as to encompass all such modifications and equivalent structures and functions.

The present disclosure can provide an optical system that achieves both weight reduction of the focus lens unit and suppression of aberration fluctuations during focusing.

This application claims the benefit of Japanese Patent Application No. 2023-035919, which was filed on Mar. 8, 2023, and which is hereby incorporated by reference herein in its entirety.

What is claimed is:

1. An optical system comprising, in order from an object side to an image side:

a first lens unit having positive refractive power;

a second lens unit having positive refractive power;

a third lens unit;

a fourth lens unit having positive refractive power; and a fifth lens unit having negative refractive power, wherein during focusing from infinity to a close distance, a distance between adjacent lens units changes and the second lens unit and the fourth lens unit move toward the object side, wherein at least one of the second lens unit and the fourth lens unit includes two or more lenses, wherein the first lens unit includes two or more negative lenses, wherein the following inequality is satisfied:

$$0.040 < T4/TTL < 0.590$$

where TTL is an overall optical length that is a distance on an optical axis from a lens surface closest to an object to an image plane of the optical system in an in-focus state at infinity, and T4 is a thickness on the optical axis of the fourth lens unit.

2. The optical system according to claim 1, wherein for focusing from infinity to the close distance, the first lens unit, the third lens unit, and the fifth lens unit are fixed relative to an image plane.

3. The optical system according to claim 1, further comprising an aperture stop between the second lens unit and the fourth lens unit.

4. The optical system according to claim 1, wherein the following inequalities are satisfied:

$$0.30 < f4/f < 4.80$$

$$0.70 < f2/f < 26.80$$

where f is a focal length of the optical system in an in-focus state at infinity, f2 is a focal length of the second lens unit, and f4 is a focal length of the fourth lens unit.

5. The optical system according to claim 1, wherein the following inequality is satisfied:

$$0.05 < f4/f2 < 1.50$$

where f2 is a focal length of the second lens unit, and f4 is a focal length of the fourth lens unit.

6. The optical system according to claim 1, wherein the following inequality is satisfied:

$$0.008 < D12/DT < 0.210$$

where DT is a distance on the optical axis from a lens surface on the object side of the first lens unit to a lens surface on the image side of a lens unit disposed closest to the image plane in the in-focus state at infinity, and D12 is a distance on the optical axis from a lens surface on the image side of the first lens unit to a lens surface on the object side of the second lens unit in the in-focus state at infinity.

7. The optical system according to claim 1, wherein the following inequality is satisfied:

$$0.020 < D34/DT < 0.530$$

where DT is a distance on the optical axis from a lens surface on the object side of the first lens unit to a lens surface on the image side of a lens unit disposed closest to the image plane in the in-focus state at infinity, and D34 is a distance on the optical axis from a lens surface on the image side of the third lens unit to a lens surface on the object side of the fourth lens unit in the in-focus state at infinity.

8. The optical system according to claim 1, wherein the following inequality is satisfied:

$$0.004 < T2/TTL < 0.120$$

where T2 is a thickness on the optical axis of the second lens unit.

9. The optical system according to claim 1, wherein the following inequality is satisfied:

$$-25.80 < f5/f < -0.90$$

where f is a focal length of the optical system in an in-focus state at infinity, and f5 is a focal length of the fifth lens unit.

10. The optical system according to claim 4, wherein the following inequality is satisfied:

$$0.05 < f4/f2 < 1.50.$$

11. The optical system according to claim 10, wherein the following inequality is satisfied:

$$-25.80 < f5/f < -0.90$$

where f5 is a focal length of the fifth lens unit.

12. The optical system according to claim 6, wherein the following inequality is satisfied:

$$0.020 < D34/DT < 0.530$$

where D34 is a distance on the optical axis from a lens surface on the image side of the third lens unit to a lens surface on the object side of the fourth lens unit in the in-focus state at infinity.

13. The optical system according to claim 12, wherein the following inequality is satisfied:

$$0.004 < T2/TTL < 0.120$$

where T2 is a thickness on the optical axis of the second lens unit.

14. The optical system according to claim 1, wherein a plurality of lens units included in the optical system consist of, in order from the object side to the image side, the first lens unit, the second lens unit, the third lens unit, the fourth lens unit, and the fifth lens unit.

15. The optical system according to claim 1, wherein a lens surface closest to the object of the second lens unit has a convex shape.

16. The optical system according to claim 1, wherein a lens surface closest to the image plane of the third lens unit has a concave shape.

17. The optical system according to claim 1, wherein a lens surface closest to the object of the fourth lens unit has a concave shape.

18. The optical system according to claim 4, wherein for focusing from infinity to the close distance, the first lens unit, the third lens unit, and the fifth lens unit are fixed relative to an image plane.

19. The optical system according to claim 4, wherein an aperture stop is disposed between the second lens unit and the fourth lens unit.

20. An image pickup apparatus comprising:

an optical system; and an image sensor configured to receive an image formed by the optical system, wherein the optical system includes, in order from an object side to an image side:

a first lens unit having positive refractive power;

a second lens unit having positive refractive power;

a third lens unit;

a fourth lens unit having positive refractive power; and a fifth lens unit having negative refractive power, wherein during focusing from infinity to a close distance, a distance between adjacent lens units changes and the second lens unit and the fourth lens unit move toward the object side, wherein at least one of the second lens unit and the fourth lens unit includes two or more lenses, wherein the first lens unit includes two or more negative lenses, wherein the following inequality is satisfied:

$$0.040 < T4/TTL < 0.590$$

where TTL is an overall optical length that is a distance on an optical axis from a lens surface closest to an object to an image plane of the optical system in an in-focus state at infinity, and T4 is a thickness on the optical axis of the fourth lens unit.

* * * * *